Patented Dec. 24, 1940

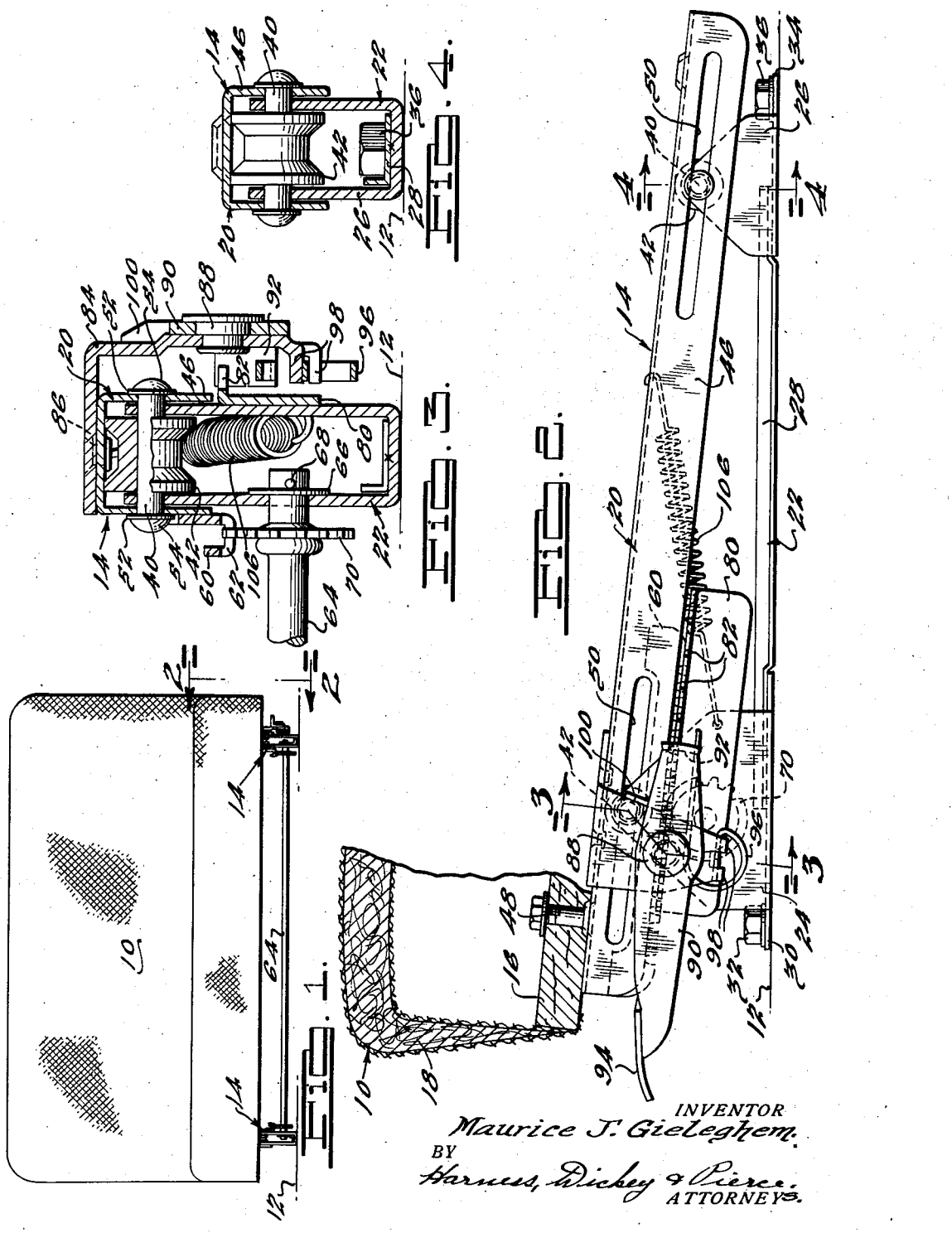

2,226,374

UNITED STATES PATENT OFFICE 2,226,374

SEAT SLIDE CONSTRUCTION

Maurice J. Gieleghem, Detroit, Mich., assignor to National Stamping Company, Detroit, Mich., a corporation of Michigan Application January 3, 1939, Serial No. 249,023

4 Claims. (Cl. 155—14)

This invention relates to means for slidably supporting a seat whereby to permit adjustment in the position thereof, and is particularly applicable for use in connection with the driver's seat of an automobile whereby to permit the position of the driver with respect to the steering wheel and other control members of the automobile to be readily adjusted.

Objects of the invention include the provision of means for slidably supporting a seat that is simple in construction, efficient in operation and economical to produce; the provision of means for slidably supporting a seat of such construction as to permit it to be constructed substantially entirely from stampings; the provision of a sliding seat support that is of unusually light construction but at the same time is amply rigid for the purpose for which it is designed; the provision of a seat slide construction that will be free from warping and binding in operation; and the provision of a sliding seat support capable of being assembled in its entirety and thereafter interposed between the seat and a supporting surface and secured thereto.

The above being among the objects of the present invention the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a front elevational view of a seat slidably supported for movement in a fore and aft direction by means constructed in accordance with the present invention;

Fig. 2 is an enlarged, partially broken, side elevational view taken on the line 2—2 of Fig. 1 and illustrating in greater detail the construction of the seat slide mechanism;

Fig. 3 is an enlarged transverse sectional view taken on the line 3—3 of Fig. 2; and, Fig. 4 is an enlarged transverse sectional view taken on the line 4—4 of Fig. 2.

Referring to the drawing and particularly to Fig. 1 a conventional seat is indicated generally at 10 of the type commonly employed as the driver's seat of an automobile. The seat 10 is supported upon the floor 12 by means of a pair of supporting devices indicated generally at 14, one positioned adjacent each side of the seat 10 and extending in approximate parallelism with respect to the corresponding side thereof and in parallelism to each other. The supporting devices 14 are identical in construction except that one is righthanded and the other lefthanded, in other words some of the various parts and portions thereof are simply reversed in position from one another, and except that the righthand device 14, as viewed in Fig. 1, is provided with a latching mechanism not present on the lefthand device 14. Consequently a description of one of the supporting devices will suffice as a description of both such devices and inasmuch as the righthand device 14 includes the latching mechanism this device will be described so as to also explain the construction and operation of the latching mechanism.

Referring to Fig. 2 it will be noted that the seat 10 includes the usual rigid seat bottom frame 16 and padded covering 18 and that the supporting device 14 is interposed between the frame 16 and floor 12. The supporting device 14 is formed of two main parts, namely the slide part indicated generally at 20 and the supporting part indicated generally at 22.

The supporting part 22 includes a front support or bracket 24 and a rear support or bracket 26 rigidly connected together and maintained in predetermined spaced relationship by means of an angle bar 28 extending between them and rigidly secured thereto. The supporting members 24 and 26 are of limited length measured in a direction longitudinally of the supporting member 14, this enabling the amount of metal required in the part 22 to be materially reduced as compared to conventional constructions.

As best illustrated in Figs. 2 and 3 the front support 24 is formed from sheet metal into a part of generally U-section, the width of the arms of the U tapering in thickness from a point adjacent the base of the U towards the tips or free ends of such arms. The base of the U of the front support 24 rests directly on the floor 12 and is forwardly extended as at 30 to provide a lug through which a bolt such as the bolt 32 may be passed in order to rigidly secure the support 24 to the floor 12.

The rear support 26 is similar in shape, section and contour to the front support 24 except that it is preferably of less height as shown and the bottom of the U thereof is provided with a rearwardly extending lug 34 for the purpose of receiving a bolt 36 employed to rigidly secure the rear support 26 to the floor 12. The connecting member or bar 28 is formed of sheet metal into the L-section shown and its opposite end portions are received within the U of the supports 24 and 26, respectively, in contact with the bottom thereof and are rigidly secured thereto as by spot welding or the like, thus forming each set of brackets 24 and 26 and connecting bar 28 into a unitary rigid structure.

A pin 40 extends between and through the upper free ends of each of the brackets 24 and 26 as best illustrated in Figs. 3 and 4, and rotatably received on each of the pins 40 between the side walls of the corresponding supports is a roller 42 the central portion of which is preferably radially inwardly recessed as shown in order to provide two axially spaced bearing surfaces on each roller as well as to provide clearance for rivets or bolt heads projecting downwardly from the center of the slide part 20. The rollers 42 project above the upper ends of the corresponding brackets 24 and 26 as indicated.

The upper part 20 of each supporting device 14 is composed principally of elongated inverted U-shaped or channel sectioned member 46 formed preferably from sheet metal. The member 46 is of a length materially greater than the distance between the rollers 42 carried by the brackets 24 and 26 so as to enable it to bridge such brackets. The interior width of the member 46 is such as to enable it to be received over the upper ends of the supports 24 and 26 with such upper ends received and relatively closely embraced thereby but in freely slidable relation therein, the inner surface of the bottom portion of the member 46 resting upon and being supported by the rollers 42. The member 46 is rigidly secured to the seat frame 16 by means of bolts 48 passing upwardly through the bottom or transverse wall of the member 46 and projecting through the frame 16.

The pins 40 which support the rollers 42 project outwardly on both sides through the side walls of the member 46, the latter being provided in each side wall with an elongated slot 50 in line with each of the pins 40 and in parallelism with the bottom or transverse wall of the member 46. As will be appreciated the slots 50 permit relative movement between the pins 40 and the member 46 longitudinally of the member 46 and consequently longitudinal movement of the member 46 relative to the supports 24 and 26 and consequently the floor 12. The ends of the pins 40 which project outwardly beyond the outer faces of the side walls of the member 46 each receive a washer 52 thereon and outwardly of the washer 52 the ends of the pins 40 are headed over as at 54 to limit outward movement of the washer 52 on their respective pins 40. The washers 52 are arranged in substantially abutting relationship with respect to the outer faces of the side walls of the member 46 and thus acts to prevent spreading movement or bulging of the side walls of the member 46 as well as spreading movement or bulging of the side walls of the supporting members 24 and 26. The roller 42 being of substantially the same length as the distance between the opposite walls of the supports 24 and 26, act as spacers to prevent movement of such walls inwardly toward one another, and act through such walls to prevent similar inward movement of the side walls of the slides 46.

It will be appreciated from the above description that the seat 10 being secured directly to the members 46 which are thus supported by the rollers 42 for movement longitudinally of the members 46 within the limits of the slots 50, the seat 10 may be caused to move forwardly or rearwardly a distance corresponding with the amount of relative travel of the pins 40 in the slots 50.

The rear supporting members 26 being of less height than the front supporting member 24, it will be appreciated that movement of the seat rearwardly from its substantial mid-position illustrated in Fig. 2 will have the effect of lowering the height of the seat 10 above the floor 12 and that movement forwardly of the position indicated in Fig. 2 will have the effect of raising the seat 10 with respect to the floor 12, this feature being desirable in most cases but not necessary in all cases as will be readily appreciated.

In order that both sides of the seat will be moved forwardly or rearwardly in unison during shifting movement of the seat 10, the following mechanism is provided. To the outer surface of the inner wall of the member 46 of each supporting device 14, and adjacent the forward end thereof, a rack member 60 is rigidly secured as by spot welding or the like. As indicated best in Fig. 3 the rack members 60 are preferably formed from sheet metal into a generally J-section with the longer leg secured to the corresponding side wall of the member 46 and the remaining short leg arranged inwardly thereof, the bottom wall of the J being transversely slotted as at 62 at equal intervals over its length in order to provide the teeth of the rack. Extending and rotatably supported between the supporting members 24 at each side of the seat 10 is a shaft 64 maintained against relative axial movement by means of washers 66 received over the respective opposite ends thereof inwardly of the side walls of the corresponding supporting member 24 and maintained in position thereon by means of pins 68. Inwardly of each of the supporting members 24 and in vertical alignment with the center of each of the racks 60 the shaft 64 has rigidly fixed thereto gears 70 arranged in meshing relation with respect to its corresponding racks 60. As will be readily appreciated the rack members 60, shaft 64 and cooperating gears 70 effectively tie the slides 20 together for equal movement either in a forwardly or rearwardly direction.

In order to enable the mechanism thus described to be locked against relative sliding movement at frequent intervals over the length of the slidably adjustable position of the seat 10 the following mechanism is provided in conjunction with the righthand supporting device 14 as viewed in Fig. 1. An L-shaped bar member 80, preferably formed from sheet metal, is rigidly secured to the outer face of the outer arm of the forward supporting member 24 by spot welding or otherwise securing its vertically disposed leg thereto. The member 80 is of greater length than the support 24 and projects rearwardly therefrom as indicated in Fig. 2. The other leg of the member 80 projects perpendicularly outwardly from the outer face of the support 24 in approximate parallelism with the path of slidable movement of the member 46, and is provided at regular intervals over its length with notches 82 opening onto the outer edge face thereof.

An L-shaped bracket member 84, preferably formed from relatively heavy sheet metal, is positioned with one leg thereof overlying the upper surface of the bottom or transverse wall of the member 46 adjacent the forward bracket 24 and is rigidly secured thereto as by rivets 86. The remaining leg of the bracket member 84 extends downwardly in outwardly spaced relation with respect to the outer leg of the bracket 24 as illustrated in Fig. 3. The depending leg of the bracket member 84 is provided with a pin 88 which serves to pivotally support a double armed latch bar 90 against the outer face of such leg. The rearwardly extending arm of the latch bar 90 is inwardly turned as at 92 to provide a lug which is engageable with any of the notches 82 which may become aligned therewith and the forward arm of the latch bar 90 terminates in a manual gripping surface 94 to permit the same to be readily manipulated.

A spiral-like spring 96, preferably formed from relatively flat stock as shown, is employed for constantly urging the latch bar 90 in a counterclockwise direction of movement into operative relation with respect to the notched edge of the member 80. For the purpose of supporting the spring 96 the lower free end of the downwardly depending leg of the bracket 84 is formed to provide three inwardly projecting fingers 98 which serve to grip and hold one end of the spring 96, the opposite end bearing against the lower edge of the lug 92, and thereby act to constantly urge the latch bar 90 in a counterclockwise direction of rotation as viewed in Fig. 2. In order to limit upward movement of the lug 92 on the latch bar 90 beyond that required for full engagement with the notches 82 in the member 80, a lug 100 is struck outwardly from the rear edge of the bracket 84 in a position to intersect the path of movement of the latch bar 90 and thus limit its movement in a counterclockwise direction of rotation. As will be appreciated, when the lug 92 is received in any one of the notches 82 the support 24 is locked to the corresponding slide part 20 and sliding movement of the seat 10 is prevented. If the end 94 of the latch bar 90 is raised to move the lug out of its cooperating notch 82, the seat is released for sliding movement within the limits of the slots 50, and upon release of the end 94 the latch bar will be moved by the spring 96 to engage the nearest notch 82 to latch the seat in its adjusted position.

From the above it will be readily appreciated that the construction thus shown and described is both simple in design and construction and may be economically produced. It will also be appreciated that the construction involves a minimum amount of material and that in spite of the small amount of material required it provides a rigid structure that will not bind readily and will be resistant to wear. It will also be understood that both of the supporting devices 14 may be completely assembled with one another and with the cross-shaft 64 and gears 70 prior to application to a seat or floor, thereby eliminating the necessity of any assembly of these parts per se during the fabrication of an automobile of which they may eventually form a part.

Formal changes may be made in the specific embodiment of the invention described without departing from the spirit or substance of the broad invention, the scope of which is commensurate with the appended claims.

What is claimed is:

1. Means for adjustably supporting a seat comprising a pair of devices positioned adjacent each side of said seat, each of said devices including a pair of relatively movable parts, one of said parts comprising a pair of longitudinally spaced one-piece U-shaped members, a bar of lighter gauge extending between and connected to said members for permanently connecting said members together, pins extending between the free ends of said U-shaped members, and rollers supported on said pins, and the other of said parts comprising a channel sectioned member arranged in embracing relationship with respect to the free ends of said U-shaped members and with the bottom of the channel thereof bearing against said rollers, said channel sectioned member extending beyond said rollers in both directions and having slots through the side walls thereof in parallelism with the bottom of said channel and in alignment with said pins, said pins projecting through said slots, means carried by said pins outwardly beyond the side walls of said channel sectioned member cooperating therewith to prevent spreading of said side walls, and means constraining both the second mentioned parts to corresponding and equal movement with respect to both the first mentioned parts.

2. A slidable seat supporting device comprising, in combination, a supporting part and a slide part, said supporting part comprising a pair of generally U-shaped separately formed one-piece members arranged with the U's thereof in alignment and in longitudinal spaced relation with respect to each other, a light gauge spacer bar extending between and fixed to said members for the purpose of connecting them together, a pin extending between the free ends of each of said U-shaped members and held against bodily movement longitudinally thereof, and a roller carried by each of said pins, said slide part including an elongated U-sectioned member extending between and supported by said rollers and with the U thereof in opposed relation with respect to said U-shaped members and closely but slidably embracing the free ends of said U-shaped members between its side walls, a notched bar fixed with respect to one of said U-shaped members and extending longitudinally beyond the same, a bracket fixed with respect to said slide part, a lever pivotally supported by said bracket, and means on said lever adapted for releasable engagement with said notched bar.

3. A slidable seat supporting device comprising, in combination, a supporting part and a slide part, said supporting part comprising a pair of separately formed generally U-shaped one-piece members arranged with the U's thereof in alignment and in longitudinally spaced relation with respect to each other, a light gauge spacer bar extending between and fixed to said members for the purpose of connecting them together, a pin extending between the free ends of each of said U-shaped members and held against bodily movement longitudinally of said supporting part, and a roller carried by each of said pins, said slide including an elongated U-sectioned member extending between and supported by said rollers and with the U thereof in opposed relation with respect to said U-shaped members and closely but slidably embracing the free ends of said U-shaped members between its side walls, said slide having slots extending longitudinally thereof in alignment with said pins and said pins projecting into said slots whereby to prevent vertical separation of said parts, a notched bar fixed with respect to one of said U-shaped members and extending longitudinally beyond the same, a bracket fixed with respect to said slide part, a lever pivotally supported by said bracket, and means on said lever adapted for releasable engagement with said notched bar.

4. A slidable seat support including, in combination, a pair of upstanding separately formed one-piece U-shaped brackets adapted to be fixed with respect to a supporting surface, a light gauge spacer bar extending between and fixed to said member for the purpose of connecting them together, an elongated U-sectioned member bridging said brackets and embracing the opposite free sides of each thereof between the side walls thereof, said elongated U-sectioned member being provided with elongated slots through said side walls thereof in parallelism with the bottom of the U thereof, a pin extending between each pair of said slots and between said free ends of each of said U-shaped members and being held against bodily movement longitudinally of the latter, a roller supported upon each of said pins and bearing against the bottom wall of said U-sectioned member whereby to provide a support therefor on said U-shaped members, the free ends of said U-shaped members being relatively closely but slidably received between the side walls of said U-sectioned member and said rollers substantially bridging the free ends of said U-shaped members whereby to serve as spacers to prevent inward collapsing of the free ends of said U-shaped members and the side walls of said U-sectioned member, and means carried by said pins outwardly of the side walls of said U-sectioned member cooperating with said side walls thereof to prevent separating movement thereof.

MAURICE J. GIELEGHEM.